United States Patent
Su et al.

(10) Patent No.: US 10,014,922 B2
(45) Date of Patent: Jul. 3, 2018

(54) HYBRID BEAMFORMING TRANSMISSION METHOD AND NETWORK DEVICE

(71) Applicant: CHINA ACADEMY OF TELECOMMUNICATIONS TECHNOLOGY, Beijing (CN)

(72) Inventors: Xin Su, Beijing (CN); Chuanjun Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/556,287

(22) PCT Filed: Jan. 22, 2016

(86) PCT No.: PCT/CN2016/071776
§ 371 (c)(1),
(2) Date: Sep. 6, 2017

(87) PCT Pub. No.: WO2016/141782
PCT Pub. Date: Sep. 15, 2016

(65) Prior Publication Data
US 2018/0062722 A1    Mar. 1, 2018

(30) Foreign Application Priority Data

Mar. 12, 2015 (CN) .......................... 2015 1 0110099

(51) Int. Cl.
*H04K 1/10* (2006.01)
*H04L 27/28* (2006.01)
(Continued)

(52) U.S. Cl.
CPC ......... *H04B 7/0617* (2013.01); *H04B 7/0626* (2013.01); *H04B 7/0634* (2013.01); *H04W 72/046* (2013.01); *H04W 72/08* (2013.01)

(58) Field of Classification Search
CPC .. H04B 7/0617; H04B 7/0634; H04B 7/0626; H04B 7/0469; H04B 7/0456;
(Continued)

(56) References Cited

U.S. PATENT DOCUMENTS 9,287,958 B2 * 3/2016 Son ..................... H04B 7/0628
9,300,383 B2 * 3/2016 Kim .................... H04B 7/0469
(Continued)

FOREIGN PATENT DOCUMENTS

CN          103748850 A      4/2014
CN          104303477 A      1/2015

OTHER PUBLICATIONS

International Search Report for PCT/CN2016/071776, dated Apr. 11, 2016, and its English translation provided by WIPO.
(Continued)

*Primary Examiner* — Phuong Phu
(74) *Attorney, Agent, or Firm* — Ladas & Parry, LLP (57) ABSTRACT

The present disclosure provides a hybrid beamforming transmission method and a network device. The hybrid beamforming transmission method includes steps of: determining, by a network device, a digital-domain beamforming weight matrix for a first UE in accordance with a channel measurement result; determining, by the network device, a set of beamforming weight matrices in accordance with the digital-domain beamforming weight matrix, and transmitting a signal to the first UE in an analog beamforming manner; selecting, by the network device, a beamforming weight matrix from the set of beamforming weight matrices in accordance with a measurement result from the first UE, as an analog-domain beamforming weight matrix for the first UE; and performing, by the network device, hybrid beamforming transmission in accordance with the deter-
(Continued)

mined digital-domain beamforming weight matrix and the selected analog-domain beamforming weight matrix.

20 Claims, 2 Drawing Sheets (51) Int. Cl.
*H04B 7/06* (2006.01)
*H04W 72/04* (2009.01)
*H04W 72/08* (2009.01)

(58) Field of Classification Search
CPC .. H04B 7/0628; H04W 72/08; H04W 72/046; H04L 25/03898; H01Q 3/26
USPC ................................. 375/260, 267, 299, 296
See application file for complete search history.

(56) References Cited

U.S. PATENT DOCUMENTS

| | | | |
|---|---|---|---|
| 9,356,809 B2* | 5/2016 | Park | ................ H04L 25/03898 |
| 9,647,735 B2* | 5/2017 | Sajadieh | ............... H04B 7/0456 |
| 9,825,679 B2* | 11/2017 | Kim | ..................... H04B 7/0617 |
| 2011/0291891 A1* | 12/2011 | Nsenga | ................ H04B 7/0617 |
| | | | 342/373 |
| 2013/0039401 A1 | 2/2013 | Han et al. | |
| 2013/0039445 A1 | 2/2013 | Hwang | |
| 2013/0057432 A1* | 3/2013 | Rajagopal | ................ H01Q 3/26 |
| | | | 342/368 |
| 2013/0258972 A1 | 10/2013 | Kim et al. | |
| 2013/0301454 A1 | 11/2013 | Seol et al. | |
| 2014/0334566 A1 | 11/2014 | Kim et al. | |

OTHER PUBLICATIONS

Written Opinion of the International Search Authority for PCT/CN2016/071776, dated Apr. 11, 2016, and its English translation provided by Bing Translator.

From EPO Application No. 16761009.6, Supplementary European Search Report and Search Opinion dated Feb. 6, 2018.

* cited by examiner

HYBRID BEAMFORMING TRANSMISSION METHOD AND NETWORK DEVICE

CROSS-REFERENCE TO RELATED APPLICATIONS

The present application is the U.S. national phase of PCT Application No. PCT/CN2016/071776 filed on Jan. 22, 2016, which claims priority to the Chinese Patent Application No. 201510110099.5 filed on Mar. 12, 2015, the disclosures of which are incorporated herein by reference in their entireties.

TECHNICAL FIELD

The present disclosure relates to the field of communication technology, in particular to a hybrid beamforming transmission method and a network device.

BACKGROUND

A Multi-Input Multi-Output (MIMO) technology plays a very important role in improving a peak rate and a system spectrum utilization rate, so such wireless access technology standard as Long Term Evolution (LTE) and LTE-Advanced (LTE-A) are constructed on the basis of an MIMO+Orthogonal Frequency Division Multiplexing (OFDM) technology.

A performance gain of the MIMO technology is derived from a spatial freedom degree available for a multi-antenna system, so during the standardization, one of the most important developments of the MIMO technology lies in the extension of dimensions.

For a base station antenna system with a conventional Passive Antenna System (PAS) structure, a plurality of antenna ports is arranged horizontally, and a plurality of elements corresponding to each antenna port in a vertical dimension is connected through a radio frequency (RF) cable. Each antenna port corresponds to a separate RF-intermediate frequency-baseband channel. Hence, it is merely able for the conventional MIMO technology to optimize spatial characteristics of each terminal signal in a horizontal dimension by adjusting a relative amplitude or phase of different antenna ports. In the vertical dimension, uniform sector-level beamforming may merely be adopted. Upon the introduction of an Active Antenna System (AAS) technology into a mobile communication system, the base station antenna system has acquired a greater freedom degree in the vertical dimension, so it is able to optimize the signal at a User Equipment (UE) level in a three-dimensional (3D) space.

On the basis of the above-mentioned research, standardization and the development of the antenna technology, the MIMO technology is being developed toward a 3D and massive direction in the industry. A massive MIMO technology will be able to remarkably increase the utilization of a system frequency band, and thereby support a larger number of UEs.

The massive MIMO technology needs a large-scale antenna array. Although it is able for a full-digital array to achieve a maximum spatial resolution as well as optimal Multi-User MIMO (MU-MIMO) performance, this structure needs a large number of analog-to-digital (AD) and digital-to-analog (DA) switching procedures and a large number of complete RF-baseband processing channels, resulting in a huge burden on both the cost and the baseband processing complexity, especially for a high frequency band and a wide bandwidth.

SUMMARY

An object of the present disclosure is to provide a hybrid beamforming transmission method and a network device, to determine a digital-domain beamforming weight matrix and an analog-domain beamforming weight matrix for a UE, thereby to facilitate the digital-analog hybrid beamforming transmission with the UE.

In one aspect, the present disclosure provides in some embodiments a hybrid beamforming transmission method, including steps of: determining, by a network device, a digital-domain beamforming weight matrix for a first UE in accordance with a channel measurement result; determining, by the network device, a set of beamforming weight matrices in accordance with the digital-domain beamforming weight matrix, and transmitting a signal to the first UE in an analog beamforming manner; selecting, by the network device, a beamforming weight matrix from the set of beamforming weight matrices in accordance with a measurement result from the first UE, as an analog-domain beamforming weight matrix for the first UE; and performing, by the network device, hybrid beamforming transmission in accordance with the determined digital-domain beamforming weight matrix and the selected analog-domain beamforming weight matrix.

In another aspect, the present disclosure provides in some embodiments a network device, including: a determination module configured to determine a digital-domain beamforming weight matrix for a first UE in accordance with a channel measurement result; a selection module configured to determine a set of beamforming weight matrices in accordance with the digital-domain beamforming weight matrix, transmit a signal to the first UE in an analog beamforming manner, and select a beamforming weight matrix from the set of beamforming weight matrices in accordance with a measurement result from the first UE, as an analog-domain beamforming weight matrix for the first UE; and a transmission module configured to perform hybrid beamforming transmission in accordance with the determined digital-domain beamforming weight matrix and the selected analog-domain beamforming weight matrix.

According to the embodiments of the present disclosure, the network device determine the digital-domain beamforming weight matrix for the UE in accordance with the channel measurement result, and acquire the analog-domain beamforming weight matrix for the UE in accordance with the digital-domain beamforming weight matrix and the channel measurement result, to perform the hybrid beamforming transmission with the UE in accordance with the digital-domain beamforming weight matrix and the analog-domain beamforming weight matrix. During the determination of the analog-domain beamforming weight matrix for the UE, a set of beamforming weight matrices are determined in accordance with the digital-domain beamforming weight matrix, channel measurement is performed in an analog beamforming manner in accordance with the set of beamforming weight matrices, and then one beamforming weight matrix is selected from the set of beamforming weight matrices as the analog-domain beamforming weight matrix for the first UE. As a result, it is able for the UE to acquire a beamforming effect of a set of analog-domain beamforming weight matrices corresponding to the digital-domain beamforming weight matrix, thereby to enable the UE to select the analog-domain beamforming weight matrix having a beam direction more accurate than a digital-domain beam direction.

DETAILED DESCRIPTION OF THE EMBODIMENTS

Figure 1:
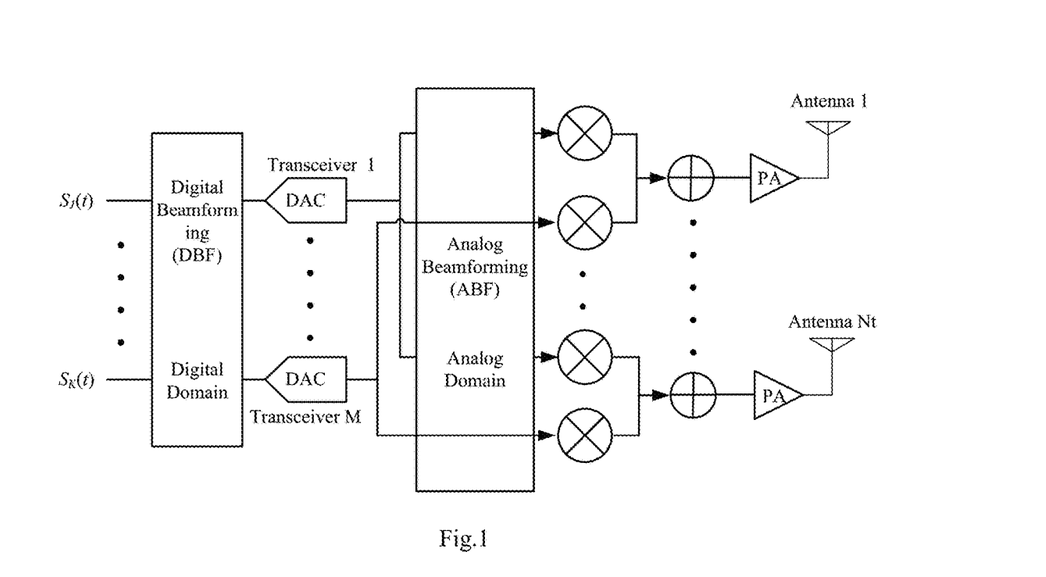
FIG. 1 is a schematic view showing a digital-analog hybrid beamforming procedure.

In order to reduce the cost and the complexity of the massive MIMO technology, recently a digital-analog hybrid beamforming technology has been presented. As shown in FIG. 1, the so-called digital-analog hybrid beamforming technology refers to, on the basis of a traditional digital-domain beamforming procedure, the addition of a further beamforming procedure for a RF signal at a front end (e.g., Analog Beamforming (ABF) in FIG. 1) adjacent to an antenna system. The ABF is capable of roughly matching the transmitted signal with a channel in a simple manner. The number of dimensions of an equivalent channel formed after the ABF is smaller than the actual number of antennae, so in the subsequent procedures, the number of AD/DA converters, the number of digital channel and the corresponding baseband processing complexity may be remarkably reduced. The interference remaining at the ABF may be further removed at a digital domain, to ensure the quality of the MU-MIMO transmission.

As compared with a full-digital beamforming technology, the digital-analog hybrid beamforming technology is a compromise proposal between the performance and the complexity, and it shows a bright practical prospect in a system with a high frequency band and a wide bandwidth or with a huge number of antennae.

Currently, with respect to the digital-analog hybrid beamforming technology, there is no scheme for determining, for a UE, a digital-domain beamforming weight matrix and an analog-domain beamforming weight matrix, to facilitate the digital-analog hybrid beamforming transmission with the UE.

In an MIMO technology, especially an MU-MIMO technology, the accuracy of Channel State Information (CSI) available at a network side may directly determine the precoding or beamforming accuracy as well as the efficiency of a scheduling algorithm, and thereby determine the performance of an entire system.

On the basis of a current structure of an LTE signal, a reference signal is embedded in a base band, so it is able to acquire, through channel estimation, a channel state for the digital beamforming. However, the number of equivalent digital channels formed by the analog beamforming is smaller than the actual number of antennae, so the number of dimensions of a channel matrix acquired through the reference signal is far less than the number of dimensions of a complete channel matrix traversed at an antenna end. Hence, there is a certain loss in both a spatial resolution and an interference inhibition capability acquired by the digital beamforming. For the analog beamforming, its processing is performed at a position more adjacent to a physical antenna, and as compared with the digital beamforming, its MIMO channel has a higher freedom degree. However, it is impossible to estimate the reference signal embedded into the base band, so it is impossible to directly use the CSI acquired at a digital domain at the analog beamforming procedure, in regardless of a Frequency Division Duplexing (FDD) or a Time Division Duplexing (TDD) system.

An object of the present disclosure is to provide a hybrid beamforming transmission scheme, so as to determine for a UE a digital-domain beamforming weight matrix and an analog-domain beamforming weight matrix, thereby to facilitate the digital-analog hybrid beamforming transmission with the UE and prevent, to some extent, the analog beamforming accuracy and the channel quality measurement accuracy from being limited.

In order to make the objects, the technical solutions and the advantages of the present disclosure more apparent, the present disclosure will be described hereinafter in conjunction with the drawings and embodiments. Obviously, the following embodiments are merely parts of, rather than all of, the embodiments of the present disclosure, and based on these embodiments, a person skilled in the art may acquire the other embodiments without any creative effect, which also fall within the scope of the present disclosure.

Parts of the embodiments of the present disclosure will be described hereinafter, so as to facilitate the understanding of the present disclosure, rather than to define critical or decisive elements of the present disclosure or define the scope of the present disclosure. On the basis of the technical solutions involved in the present disclosure, any other implementations may be acquired through substitutions, without departing from the spirit of the present disclosure.

In the embodiments of the present disclosure, the hybrid beamforming transmission scheme may include hybrid beamforming reception and/or hybrid beamforming transmission. The CSI acquired through the digital-domain channel estimation may be used to aid the beamforming procedure at an analog domain, so as to improve the beamforming accuracy.

In the embodiments of the present disclosure, the so-called "digital-domain beamforming weight matrix" is used for performing a beamforming operation at a baseband portion, and the so-called "analog-domain beamforming weight matrix" is used for performing the beamforming operation at a front end portion adjacent to an antenna system.

Figure 2:
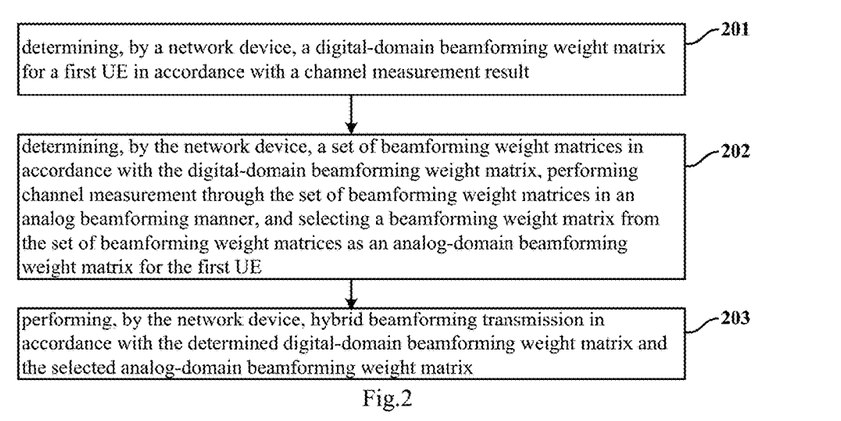
FIG. 2 is a flow chart of a hybrid beamforming transmission method according to one embodiment of the present disclosure.

As shown in FIG. 2, the present disclosure provides in some embodiments a hybrid beamforming transmission method for a network device at a network side. The network device may be a base station, or any other network device having a function of the base station. The hybrid beamforming transmission method may include: Step 201 of determining, by the network device, a digital-domain beamforming weight matrix for a first UE in accordance with a channel measurement result; Step 202 of determining, by the network device, a set of beamforming weight matrices in accordance with the digital-domain beamforming weight matrix, performing channel measurement through the set of beamforming weight matrices in an analog beamforming manner, and selecting a beamforming weight matrix from the set of beamforming weight matrices as an analog-domain beamforming weight matrix for the first UE; and Step 203 of performing, by the network device, hybrid beamforming transmission in accordance with the determined digital-domain beamforming weight matrix and the selected analog-domain beamforming weight matrix.

In Step 203, the transmission includes sending and/or receiving. To be specific, Step 203 may include sending data to the first UE and/or receiving data from the first UE in a hybrid beamforming manner.

In a possible embodiment of the present disclosure, in Step 202, the number of the analog-domain beamforming weight matrices selected for the first UE may be one or more. In the case that a plurality of analog-domain beamforming weight matrices has been selected for one UE, in the case of scheduling the UEs, e.g., in a joint manner, the network device may select the analog-domain beamforming weight matrices with small interference therebetween for the UEs in accordance with the corresponding analog-domain beamforming weight matrices to reduce the interference. The first UE is any UE within a coverage range of the network device.

In Step 201, the network device may determine the digital-domain beamforming weight matrix by measuring a downlink channel or an uplink channel.

In the case that the network device determines the digital-domain beamforming weight matrix by measuring the downlink channel, a set of precoding matrices may be predefined at a system, and this set of precoding matrices may also be called as a codebook. The set of precoding matrices may correspond to a set of digital-domain beams, and each beam may be represented by one beamforming weight matrix. In other words, the set of precoding matrices may correspond to a set of digital-domain beamforming weight matrices. In a possible embodiment of the present disclosure, each precoding matrix in the set of precoding matrices may correspond to one digital-domain beamforming weight matrix, and the digital-domain beamforming weight matrices corresponding to the precoding matrices may be different from each other. The constitution of the set of precoding matrices may be pre-agreed, and thus will be known to both the network device and the UEs before the communication.

In a possible embodiment of the present disclosure, the precoding matrices as well as an index of the digital-domain beamforming weight matrix corresponding to each precoding matrix may be configured at both a UE side and a network side. For example, in the case of determining the digital-domain beamforming weight matrix for the first UE (the first UE may be any UE within the coverage range of the network device), the network device may transmit to the first UE a downlink reference signal, which may be a Channel State Information Reference Signal (CSI-RS), a Cell Reference Signal (CRS), or any other reference signal for the measurement of downlink channel information. The first UE may measure the downlink reference signal to acquire a channel estimation value of the downlink reference signal at the digital domain, and select a corresponding precoding matrix from the set of precoding matrices in accordance with the channel estimation value and the set of precoding matrices known to both the first UE and the network device, and feed back a Precoding Matrix Indicator (PMI) of the selected precoding matrix to the network device. The PMI is just an index of the beamforming weight matrix. Then, the network device may determine the digital-domain beamforming weight matrix for the first UE. In the case that the first UE selects the precoding matrix in accordance with the channel estimation value and the set of precoding matrices known to both the first UE and the network device, it may select the precoding matrix capable of maximizing a channel capacity after the beamforming (a capacity maximization principle), or select the precoding matrix capable of maximizing a Signal-to-Interference plus Noise Ratio (SINR) after the beamforming (a SINR maximization principle).

Still taking the determination of the digital-domain beamforming weight matrix for the first UE (the first UE may be any UE within the coverage range of the network device) as an example, in the case that the network devices determine the digital-domain beamforming weight matrix by measuring the uplink channel, the network device may measure an uplink signal from the first UE, to acquire the digital-domain CSI. The uplink signal may be an uplink reference signal, e.g., a Sounding Reference Signal (SRS) or a Demodulation Reference Signal (DM-RS). The network device may then determine the digital-domain beamforming weight matrix for the first UE in accordance with the acquired digital-domain CSI and a digital-domain beamforming method adopted thereby. For example, the network device may perform Eigen Value Decomposition (EVD) on the CSI about the first UE, to acquire an optimal digital-domain beamforming weight, i.e., select an eigenvector corresponding to a maximum eigen value of a channel correlation matrix.

In Step 202, the network device may acquire the analog-domain beamforming weight matrix on the basis of downlink measurement or uplink measurement.

Taking the determination of the analog-domain beamforming weight matrix for the first UE as an example (the first UE may be any UE within the coverage range of the network device), in the case that the network device acquires an analog-domain beamforming weight through the downlink measurement, the network device may determine a spatial range and a set of beamforming weight matrices in accordance with a beam corresponding to the digital-domain beamforming weight matrix determined in Step 201 for the first UE, and the beam corresponding to the set of beamforming weight matrices may be located within the spatial range. Then, the network device may transmit a signal within the spatial range in an analog beamforming manner in accordance with each beamforming weight matrix in the set of beamforming weight matrices, and receive a measurement result from the first UE. Finally, the network device may select, in accordance with the measurement result, the analog-domain beamforming weight matrix from the set of beamforming weight matrices for the first UE.

To be specific, the first UE may measure the signal. The signal refers to a signal transmitted by the network device within the spatial range in an analog beamforming manner in accordance with each beamforming weight matrix in the set of beamforming weight matrices. The first UE may then select at least one beamforming weight matrix from the set of beamforming weight matrices in accordance with the measurement result, and feed back information about an index of the selected beamforming weight matrix to the network device. The network device may receive from the first UE the information about the index of the selected beamforming weight matrix fed back with respect to the signal, and determine the corresponding analog-domain beamforming weight matrix in accordance with the information about the index.

The first UE may further estimate an equivalent channel matrix for the beamforming weight matrix in accordance with the selected beamforming weight matrix, calculate corresponding channel quality, and report the channel quality to the network device, so that the network device may configure a Modulation and Coding Scheme (MSC) on the basis of the channel quality in the case of scheduling the first UE.

In a possible embodiment of the present disclosure, the spatial range is a range with a beam corresponding to the digital-domain beamforming weight matrix determined for the first UE as a center and with a distance between the beam and a boundary of the spatial range as a predetermined distance. The set of beamforming weight matrices may be selected in accordance with a set of analog-domain precoding matrices, and each beam corresponding to the set of beamforming weight matrices may be located within the spatial range. In a possible embodiment of the present disclosure, the set of beamforming weight matrices are those in the set of analog-domain precoding matrices and closest to the beam at the center of the spatial range. The set of analog-domain precoding matrices are known to both the network device and the UE before the communication.

For example, the network device may determine the spatial range in accordance with a certain distance measure and the predetermined distance, with a horizontal angle and a pitch angle corresponding to the digital-domain beamforming weight matrix determined in Step 201 as a center. Then, the network device may select the set of beamforming weight matrices closest to the angles from the set of analog-domain precoding matrices, and transmit the signal in the analog beamforming manner in accordance with a predetermined step length within the spatial range. The set of analog-domain precoding matrices and indices of the beamforming weight matrices corresponding to the analog-domain precoding matrices in the set may be known to both the network device and the UE before the communication. In addition, the number of the beamforming weight matrices in the set of beamforming weight matrices selected by the network device may also be known to both the network device and the UE.

During the determination of the analog-domain beamforming weight matrix for the first UE, the network device may transmit the signal in an analog beamforming manner within the spatial range in accordance with each beamforming weight matrix in the set of beamforming weight matrices in any one of the following modes, to enable the UE to recognize any beam in accordance with a signal transmission mode.

Mode 1: a time-division mode. In this mode, the network device may use different analog-domain beamforming weight matrices to transmit the signal in an analog beamforming manner on different time-domain resources. For example, the network device may use different analog-domain beamforming weight matrices to transmit the signal in an analog beamforming manner at different time points.

Mode 2: a frequency-division mode. In this mode, the network device may use different analog-domain beamforming weight matrices to transmit the signal in an analog beamforming manner on different frequency-domain resources. For example, the network device may use different analog-domain beamforming weight matrices to transmit the signal in an analog beamforming manner on different sets of subcarriers.

Mode 3: a time-frequency combination mode. In this mode, the network device may use different analog-domain beamforming weight matrices to transmit the signal in an analog beamforming manner on different time/frequency resources. For example, the network device may use different analog-domain beamforming weight matrices to transmit the signal in an analog beamforming manner at different time points and on different sets of subcarriers.

The UE may perform the downlink channel measurement using one of the above three modes in accordance with a pre-agreed measurement triggering condition, to acquire the analog-domain beamforming weight matrix.

Still taking the determination of the analog-domain beamforming weight matrix for the first UE as an example (the first UE may be any UE within the coverage range of the network device), in the case that the network device acquires the analog-domain beamforming weight through the uplink measurement, the network device may determine a spatial range and a set of beamforming weight matrices in accordance with a beam corresponding to the digital-domain beamforming weight matrix determined in Step 201, and the beam corresponding to the set of beamforming weight matrices may be located within the spatial range. The network device may then receive an uplink signal within the spatial range in accordance with each beamforming weight matrix in the set of beamforming weight matrices, to acquire an equivalent channel corresponding to each beamforming weight matrix in the set of beamforming weight matrices. Finally, the network device may select the analog-domain beamforming weight matrix from the set of beamforming weight matrices in accordance with the equivalent channel corresponding to each beamforming weight matrix.

In a possible embodiment of the present disclosure, the spatial range is a range with the beam corresponding to the digital-domain beamforming weight matrix determined for the first UE as a center and with a distance from the beam to a boundary of the spatial range as a predetermined range.

The set of beamforming weight matrices may be selected in accordance with the set of analog-domain precoding matrices, and each beam corresponding to the set of beamforming weight matrices may be located within the spatial range. In a possible embodiment of the present disclosure, the set of beamforming weight matrices may be those in the set of analog-domain precoding matrices and closest to the beam at the center of the spatial range. The set of analog-domain precoding matrices are known to both the network device and the UE before the communication. The set of beamforming weight matrices may also those generated by the network device within the spatial range in accordance with a predetermined step length.

For example, the network device may determine the spatial range in accordance with a certain distance measure and the predetermined distance, with a horizontal angle and a pitch angle corresponding to the digital-domain beamforming weight matrix determined in Step 201 as a center. Then, the network device may select the set of beamforming weight matrices closest to the angles from the set of analog-domain precoding matrices, and receive the uplink signal in accordance with the predetermined step length and the set of beamforming weight matrices within the spatial range determined in accordance with the center and the predetermined distance, to acquire an equivalent channel and select several analog-domain beamforming weight matrices. During the measurement of the analog-domain beamforming weight matrices, the uplink measurement signals may be transmitted by the UE at different time points, or on different sets of subcarriers, or a combination thereof.

In Step 203, the network device may beamform the signal transmitted to the first UE or the signal received from the first UE using the digital-domain beamforming weight matrix determined for the first UE at a baseband portion, and beamform the signal transmitted to the first UE or the signal received from the first UE using the analog-domain beamforming weight matrix determined for the first UE at a front end adjacent to an antenna system, as shown in FIG. 1.

According to the embodiments of the present disclosure, the network device determine the digital-domain beamforming weight matrix for the UE in accordance with the channel measurement result, and acquire the analog-domain beamforming weight matrix for the UE in accordance with the digital-domain beamforming weight matrix and the channel measurement result, to perform the hybrid beamforming transmission with the UE in accordance with the digital-domain beamforming weight matrix and the analog-domain beamforming weight matrix. During the determination of the analog-domain beamforming weight matrix for the UE, a set of beamforming weight matrices are determined in accordance with the digital-domain beamforming weight matrix, channel measurement is performed in an analog beamforming manner in accordance with the set of beamforming weight matrices, and then one beamforming weight matrix is selected from the set of beamforming weight matrices as the analog-domain beamforming weight matrix for the first UE. As a result, it is able for the UE to acquire a beamforming effect of a set of analog-domain beamforming weight matrices corresponding to the digital-domain beamforming weight matrix, thereby to enable the UE to select the analog-domain beamforming weight matrix having a beam direction more accurate than a digital-domain beam direction.

In addition, in the case of measuring the channel quality, the UE actually has known the possible channel quality for the service transmission by measuring a set of analog beams, so it is able to ensure the measurement accuracy of the channel quality.

Subsequent to Step 202, the hybrid beamforming transmission method may further include performing, by the network device reception beamforming in accordance with the analog-domain beamforming weight matrix selected for the first UE at the digital domain to acquire an equivalent channel, and re-determining, by the network device, a new digital-domain beamforming weight matrix for the first UE in accordance with the equivalent channel. Correspondingly, in Step 203, the network device may perform the hybrid beamforming transmission with the first UE in accordance with the analog-domain beamforming weight matrix determined for the first UE in Step 202 and the new digital-domain beamforming weight matrix re-determined for the first UE.

Subsequent to the selection of the analog-domain beamforming weight matrix for the UE, the network device may reselect the digital-domain beamforming weight matrix, to improve the digital-domain beam accuracy. The network device may calculate the digital-domain beamforming weight matrix with the improved the digital-domain beam accuracy, to further improve the entire beamforming effect.

Based on an identical inventive concept, the present disclosure further provides in some embodiments a network device for the above-mentioned hybrid beamforming transmission method. The network device may be a base station.

Figure 3:
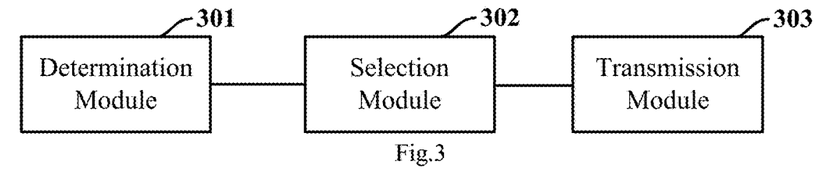
FIG. 3 is a schematic view showing a network device according to one embodiment of the present disclosure.

As shown in FIG. 3, the present disclosure provides in some embodiments a network device, which may include: a determination module 301 configured to determine a digital-domain beamforming weight matrix for a first UE in accordance with a channel measurement result; a selection module 302 configured to determine a set of beamforming weight matrices in accordance with the digital-domain beamforming weight matrix, transmit a signal to the first UE in an analog beamforming manner, and select a beamforming weight matrix from the set of beamforming weight matrices in accordance with a measurement result from the first UE, as an analog-domain beamforming weight matrix for the first UE; and a transmission module 303 configured to perform hybrid beamforming transmission in accordance with the determined digital-domain beamforming weight matrix and the selected analog-domain beamforming weight matrix.

Here, the transmission includes sending and/or receiving. To be specific, the transmission module 303 may send data to the first UE and/or receive data from the first UE in a hybrid beamforming manner.

In a possible embodiment of the present disclosure, the determination module 301 may be further configured to transmit a downlink reference signal, receive from the first UE a PMI acquired by performing downlink channel measurement in accordance with the downlink reference signal, and determine the corresponding digital-domain beamforming weight matrix in accordance with the PMI.

In a possible embodiment of the present disclosure, the determination module 301 may be further configured to measure an uplink signal from the first UE to acquire digital-domain CSI, and determine the digital-domain beamforming weight matrix for the first UE in accordance with the digital-domain CSI and a digital-domain beamforming method adopted thereby.

In a possible embodiment of the present disclosure, the selection module 302 may be further configured to: determine a spatial range and a set of beamforming weight matrices in accordance with a beam corresponding to the digital-domain beamforming weight matrix, each beam correspond to the set of beamforming weight matrices being located within the spatial range; transmit a signal within the spatial range in an analog beamforming manner in accordance with each beamforming weight matrix in the set of beamforming weight matrices, and receive a measurement result from the first UE; and select the analog-domain beamforming weight matrix from the set of beamforming weight matrices for the first UE in accordance with the measurement result.

The selection module 302 may receive information about an index of the beamforming weight matrix fed back by the first UE with respect to the signal, and determine the corresponding analog-domain beamforming weight matrix in accordance with the information about the index of the beamforming weight matrix fed back by the first UE. The first UE may measure the signal, select at least one beamforming weight matrix from the set of beamforming weight matrices in accordance with a measurement result, and feed back the information about the index of the selected beamforming weight matrix to the network device.

The selection module 302 may transmit the signal in an analog beamforming manner within the spatial range in any one of the following modes. To be specific, the selection module 302 may use different analog-domain beamforming weight matrices to transmit the signal in an analog beamforming manner on different time-domain resources, or on different frequency-domain resources, or on different time-domain and frequency-domain resources.

In a possible embodiment of the present disclosure, the selection module 302 may be further configured to: determine a spatial range and a set of beamforming weight matrices in accordance with a beam corresponding to the digital-domain beamforming weight matrix, each beam corresponding to the set of beamforming weight matrices being located within the spatial range; receive an uplink signal within the spatial range in accordance with each beamforming weight matrix in the set of beamforming weight matrices, to acquire an equivalent channel corresponding to each beamforming weight matrix in the set of beamforming weight matrices; and select the analog-domain beamforming weight matrix from the set of beamforming weight matrices in accordance with the equivalent channel corresponding to each beamforming weight matrix.

In a possible embodiment of the present disclosure, the determination module 301 may be further configured to, after the selection module has selected the analog-domain beamforming weight matrix, perform a reception beamforming operation on the analog-domain beamforming weight matrix selected for the first UE at a digital domain to acquire an equivalent channel, and re-determine a new digital-domain beamforming weight matrix for the first UE in accordance with the equivalent channel.

In a possible embodiment of the present disclosure, the spatial range may be a range with a beam corresponding to the digital-domain beamforming weight matrix as a center and with a distance between the beam and a boundary of the spatial range as a predetermined distance. The set of beamforming weight matrices may be selected in accordance with a set of analog-domain precoding matrices, and each beam corresponding to the set of beamforming weight matrices may be located within the spatial range.

In a possible embodiment of the present disclosure, the number of the beamforming weight matrices selected by the selection module 302 from the set of beamforming weight matrices may be one or more.

Figure 4:
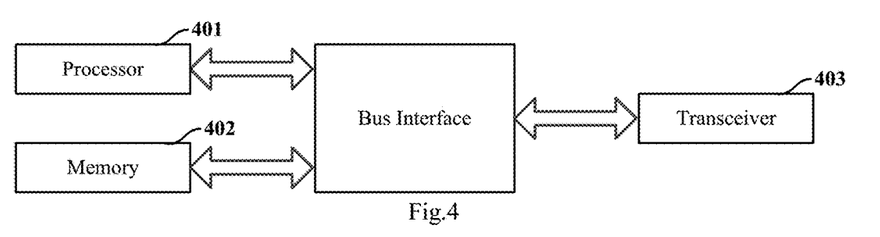
FIG. 4 is another schematic view showing the network device according to one embodiment of the present disclosure.

Based on an identical inventive concept, the present disclosure further provides in some embodiments a network device for the above-mentioned hybrid beamforming transmission method. As shown in FIG. 4, the network device may include a processor 401, a memory 402, a transceiver 403 and a bus interface.

In FIG. 4, bus architecture may include a number of buses and bridges connected to each other, so as to connect various circuits for one or more processors 401 and one or more memories 402. In addition, as is known in the art, the bus architecture may be used to connect any other circuits, such as a circuit for a peripheral device, a circuit for a voltage stabilizer and a power management circuit. Bus interfaces are provided, and the transceiver 403 may consist of a plurality of elements, i.e., a transmitter and a receiver for communication with any other devices over a transmission medium. The processor 401 may take charge of managing the bus architecture as well as general processings. The memory 402 may store therein data for the operation of the processor 401. The transceiver 403 may be configured to receive and transmit data under the control of the processor 401.

The processor 401 is configured to read a program stored in the memory 402, to: determine a digital-domain beamforming weight matrix for a first UE in accordance with a channel measurement result; determine a set of beamforming weight matrices in accordance with the digital-domain beamforming weight matrix, transmit a signal to the first UE in an analog beamforming manner, and select a beamforming weight matrix from the set of beamforming weight matrices in accordance with a measurement result from the first UE, as an analog-domain beamforming weight matrix for the first UE; and perform hybrid beamforming transmission in accordance with the determined digital-domain beamforming weight matrix and the selected analog-domain beamforming weight matrix.

In a possible embodiment of the present disclosure, the processor 401 may be further configured to transmit, through the transceiver 403, a downlink reference signal, receive, through the transceiver 403, from the first UE a PMI acquired by performing downlink channel measurement in accordance with the downlink reference signal, and determine the corresponding digital-domain beamforming weight matrix in accordance with the PMI.

In a possible embodiment of the present disclosure, the processor 401 may be further configured to measure an uplink signal from the first UE to acquire digital-domain CSI, and determine the digital-domain beamforming weight matrix for the first UE in accordance with the digital-domain CSI and a digital-domain beamforming method adopted thereby.

In a possible embodiment of the present disclosure, the processor 401 may be further configured to: determine a spatial range and a set of beamforming weight matrices in accordance with a bam corresponding to the digital-domain beamforming weight matrix, each beam correspond to the set of beamforming weight matrices being located within the spatial range; transmit, through the transceiver 403, a signal within the spatial range in an analog beamforming manner in accordance with each beamforming weight matrix in the set of beamforming weight matrices, and receive a measurement result from the first UE; and select the analog-domain beamforming weight matrix from the set of beamforming weight matrices for the first UE in accordance with the measurement result.

In a possible embodiment of the present disclosure, the processor 401 may be further configured to: receive, through the transceiver 403, information about an index of the beamforming weight matrix fed back by the first UE with respect to the signal, and determine the corresponding analog-domain beamforming weight matrix in accordance with the information about the index of the beamforming weight matrix fed back by the first UE. The first UE may measure the signal, select at least one beamforming weight matrix from the set of beamforming weight matrices in accordance with a measurement result, and feed back the information about the index of the selected beamforming weight matrix to the network device.

In a possible embodiment of the present disclosure, the processor 401 may be further configured to transmit, through the transceiver 403, the signal in an analog beamforming manner within the spatial range in any one of the following modes. To be specific, the processor 401 may use different analog-domain beamforming weight matrices to transmit the signal in an analog beamforming manner on different time-domain resources, or on different frequency-domain resources, or on different time/frequency-domain resources.

In a possible embodiment of the present disclosure, the processor 401 may be further configured to: determine a spatial range and a set of beamforming weight matrices in accordance with a beam corresponding to the digital-domain beamforming weight matrix, each beam corresponding to the set of beamforming weight matrices being located within the spatial range; receive, through the transceiver 403, an uplink signal within the spatial range in accordance with each beamforming weight matrix in the set of beamforming weight matrices, to acquire an equivalent channel corresponding to each beamforming weight matrix in the set of beamforming weight matrices; and select the analog-domain beamforming weight matrix from the set of beamforming weight matrices in accordance with the equivalent channel corresponding to each beamforming weight matrix.

In a possible embodiment of the present disclosure, the processor 401 may be further configured to, after the selection of the analog-domain beamforming weight matrix, perform a reception beamforming operation on the analog-domain beamforming weight matrix selected for the first UE at a digital domain to acquire an equivalent channel, and re-determine a new digital-domain beamforming weight matrix for the first UE in accordance with the equivalent channel.

In a possible embodiment of the present disclosure, the spatial range may be a range with a beam corresponding to the digital-domain beamforming weight matrix as a center and with a distance between the beam and a boundary of the spatial range as a predetermined distance. The set of beamforming weight matrices may be selected in accordance with a set of analog-domain precoding matrices, and each beam corresponding to the set of beamforming weight matrices may be located within the spatial range.

In a possible embodiment of the present disclosure, the number of the beamforming weight matrices selected by the processor 401 from the set of beamforming weight matrices may be one or more.

According to the embodiments of the present disclosure, the network device determine the digital-domain beamforming weight matrix for the UE in accordance with the channel measurement result, and acquire the analog-domain beamforming weight matrix for the UE in accordance with the digital-domain beamforming weight matrix and the channel measurement result, to perform the hybrid beamforming transmission with the UE in accordance with the digital-domain beamforming weight matrix and the analog-domain beamforming weight matrix. During the determination of the analog-domain beamforming weight matrix for the UE, a set of beamforming weight matrices are determined in accordance with the digital-domain beamforming weight matrix, channel measurement is performed in an analog beamforming manner in accordance with the set of beamforming weight matrices, and then one beamforming weight matrix is selected from the set of beamforming weight matrices as the analog-domain beamforming weight matrix for the first UE. As a result, it is able for the UE to acquire a beamforming effect of a set of analog-domain beamforming weight matrices corresponding to the digital-domain beamforming weight matrix, thereby to enable the UE to select the analog-domain beamforming weight matrix having a beam direction more accurate than a digital-domain beam direction.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A hybrid beamforming transmission method, comprising steps of:
   determining, by a network device, a digital-domain beamforming weight matrix for a first User Equipment (UE) in accordance with a channel measurement result;
   determining, by the network device, a set of beamforming weight matrices in accordance with the digital-domain beamforming weight matrix, and transmitting a signal to the first UE in an analog beamforming manner;
   selecting, by the network device, a beamforming weight matrix from the set of beamforming weight matrices in accordance with a measurement result from the first UE, as an analog-domain beamforming weight matrix for the first UE; and
   performing, by the network device, hybrid beamforming transmission in accordance with the determined digital-domain beamforming weight matrix and the selected analog-domain beamforming weight matrix.

2. The hybrid beamforming transmission method according to claim 1, wherein the step of determining, by the network device, the digital-domain beamforming weight matrix for the first UE in accordance with the channel measurement result comprises transmitting, by the network device, a downlink reference signal, receiving from the first UE a Precoding Matrix Indicator (PMI) acquired by performing downlink channel measurement in accordance with the downlink reference signal, and determining the corresponding digital-domain beamforming weight matrix in accordance with the PMI.

3. The hybrid beamforming transmission method according to claim 1, wherein the step of determining, by the network device, the digital-domain beamforming weight matrix in accordance with the channel measurement result comprises:
   measuring, by the network device, an uplink signal from the first UE to acquire digital-domain Channel State Information (CSI); and
   determining, by the network device, the digital-domain beamforming weight matrix for the first UE in accordance with the digital-domain CSI and a digital-domain beamforming method adopted thereby.

4. The hybrid beamforming transmission method according to claim 1, wherein the set of beamforming weight matrices correspond to a spatial range, and a beam corresponding to each beamforming weight matrix in the set of beamforming weight matrices is located within the spatial range.

5. The hybrid beamforming transmission method according to claim 4, wherein the step of selecting, by the network device, the beamforming weight matrix from the set of beamforming weight matrices in accordance with the measurement result from the first UE as the analog-domain beamforming weight matrix for the first UE comprises:
receiving, by the network device, information about an index of the beamforming weight matrix fed back by the first UE with respect to the signal; and
determining, by the network device, the corresponding analog-domain beamforming weight matrix in accordance with the information about the index of the beamforming weight matrix fed back by the first UE,
wherein the first UE is configured to measure the signal, select the corresponding beamforming weight matrix from the set of beamforming weight matrices in accordance with a measurement result, and feed back the information about the index of the selected beamforming weight matrix to the network device.

6. The hybrid beamforming transmission method according to claim 4, wherein the network device is configured to transmit the signal in an analog beamforming manner within the spatial range by:
using different analog beamforming weight matrices to transmit the signal in an analog beamforming manner on different time-domain resources; or
using different analog beamforming weight matrices to transmit the signal in an analog beamforming manner on different frequency-domain resources; or
using different analog beamforming weight matrices to transmit the signal in an analog beamforming manner on different time/frequency resources.

7. The hybrid beamforming transmission method according to claim 1, wherein the step of determining, by the network device, the set of beamforming weight matrices in accordance with the digital-domain beamforming weight matrix, and selecting the beamforming weight matrix from the set of beamforming weight matrices as the analog-domain beamforming weight matrices for the first UE comprises:
determining, by the network device, a spatial range and a set of beamforming weight matrices in accordance with a beam corresponding to the digital-domain beamforming weight matrix, each beam corresponding to the set of beamforming weight matrices being located within the spatial range;
receiving, by the network device, an uplink signal within the spatial range in accordance with each beamforming weight matrix in the set of beamforming weight matrices, to acquire an equivalent channel corresponding to each beamforming weight matrix in the set of beamforming weight matrices; and
selecting, by the network, the analog-domain beamforming weight matrix from the set of beamforming weight matrices in accordance with the equivalent channel corresponding to each beamforming weight matrix.

8. The hybrid beamforming transmission method according to claim 4, wherein the spatial range is a range with a beam corresponding to the digital-domain beamforming weight matrix as a center and with a distance between the beam to a boundary of the spatial range as a predetermined range; and the set of beamforming weight matrices are selected in accordance with a set of analog-domain precoding matrices, and each beam corresponding to the set of beamforming weight matrices is located within the spatial range.

9. The hybrid beamforming transmission method according to claim 1, wherein subsequent to the step of selecting, by the network device, the analog-domain beamforming weight matrix, the hybrid beamforming transmission method further comprises:
performing, by the network device, a reception beamforming operation at a digital domain in accordance with the analog-domain beamforming weight matrix selected for the first UE, to acquire an equivalent channel; and
re-determining, by the network device, a new digital-domain beamforming weight matrix for the first UE in accordance with the equivalent channel.

10. The hybrid beamforming transmission method according to claim 1, wherein the number of the beamforming weight matrices selected by the network device from the set of beamforming weight matrices is one or more.

11. A network device, comprising a processor, a memory and a transceiver, wherein
the memory is configured to store therein data for the operation of the processor,
the transceiver is configured to receive and transmit data, and
the processor is configured to read a program stored in the memory, to: determine a digital-domain beamforming weight matrix for a first User Equipment (UE) in accordance with a channel measurement result; determine a set of beamforming weight matrices in accordance with the digital-domain beamforming weight matrix, transmit a signal to the first UE in an analog beamforming manner, and select a beamforming weight matrix from the set of beamforming weight matrices in accordance with a measurement result from the first UE, as an analog-domain beamforming weight matrix for the first UE; and perform hybrid beamforming transmission in accordance with the determined digital-domain beamforming weight matrix and the selected analog-domain beamforming weight matrix.

12. The network device according to claim 11, wherein the processor is further configured to transmit a downlink reference signal, receive from the first UE a Precoding Matrix Indicator (PMI) acquired by performing downlink channel measurement in accordance with the downlink reference signal, and determine the corresponding digital-domain beamforming weight matrix in accordance with the PMI.

13. The network device according to claim 11, wherein the processor is further configured to: measure an uplink signal from the first UE to acquire digital-domain Channel State Information (CSI); and determine the digital-domain beamforming weight matrix for the first UE in accordance with the digital-domain CSI and a digital-domain beamforming method adopted thereby.

14. The network device according to claim 11, wherein the set of beamforming weight matrices correspond to a spatial range, and each beam corresponding to each beamforming weight matrix in the set of beamforming weight matrices is located within the spatial range.

15. The network device according to claim 14, wherein the processor is further configured to:
  receive information about an index of the beamforming weight matrix fed back by the first UE with respect to the signal; and
  determine the corresponding analog-domain beamforming weight matrix in accordance with the information about the index of the beamforming weight matrix fed back by the first UE,
  wherein the first UE is configured to measure the signal, select the corresponding beamforming weight matrix from the set of beamforming weight matrices in accordance with a measurement result, and feed back the information about the index of the selected beamforming weight matrix to the network device.

16. The network device according to claim 14, wherein the processor is further configured to transmit the signal in an analog beamforming manner within the spatial range by:
  using different analog beamforming weight matrices to transmit the signal in an analog beamforming manner on different time-domain resources; or
  using different analog beamforming weight matrices to transmit the signal in an analog beamforming manner on different frequency-domain resources; or
  using different analog beamforming weight matrices to transmit the signal in an analog beamforming manner on different time/frequency resources.

17. The network device according to claim 11, wherein the processor is further configured to:
  determine a spatial range and a set of beamforming weight matrices in accordance with a beam corresponding to the digital-domain beamforming weight matrix, each beam corresponding to the set of beamforming weight matrices being located within the spatial range;
  receive an uplink signal within the spatial range in accordance with each beamforming weight matrix in the set of beamforming weight matrices, to acquire an equivalent channel corresponding to each beamforming weight matrix in the set of beamforming weight matrices; and
  select the analog-domain beamforming weight matrix from the set of beamforming weight matrices in accordance with the equivalent channel corresponding to each beamforming weight matrix.

18. The network device according to claim 14, wherein the spatial range is a range with a beam corresponding to the digital-domain beamforming weight matrix as a center and with a distance between the beam to a boundary of the spatial range as a predetermined range; and
  the set of beamforming weight matrices are selected in accordance with a set of analog-domain precoding matrices, and each beam corresponding to the set of beamforming weight matrices is located within the spatial range.

19. The network device according to claim 11, wherein the processor is further configured to:
  after the processor has selected the analog-domain beamforming weight matrix, perform a reception beamforming operation at a digital domain in accordance with the analog-domain beamforming weight matrix selected for the first UE, to acquire an equivalent channel; and
  re-determine a new digital-domain beamforming weight matrix for the first UE in accordance with the equivalent channel.

20. The network device according to claim 11, wherein the number of the beamforming weight matrices selected by the processor from the set of beamforming weight matrices is one or more.

* * * * *